United States Patent [19]

Lin et al.

[11] Patent Number: 4,891,415

[45] Date of Patent: Jan. 2, 1990

[54] PROCESS FOR GRAFTING LIGNIN WITH VINYLIC MONOMERS USING SEPARATE STREAMS OF INITIATOR AND MONOMER

[75] Inventors: Stephen Y. Lin; Lori L. Bushar, both of Wausau, Wis.

[73] Assignee: Daishowa Chemicals Inc., Wausau, Wis.

[21] Appl. No.: 299,131

[22] Filed: Jan. 23, 1989

[51] Int. Cl.⁴ .......................... C05G 3/04; C05G 3/02
[52] U.S. Cl. ...................................................... 527/400
[58] Field of Search ........................................ 527/400

[56] References Cited

U.S. PATENT DOCUMENTS 4,276,077  6/1981  Zaslavsky et al. ................. 71/64.01
4,374,738  2/1983  Kelley ................................ 252/8.51

FOREIGN PATENT DOCUMENTS 1168515  7/1985  U.S.S.R. .

OTHER PUBLICATIONS

"Study of the Graft Copolymerization of Lignosulfonate and Acrylic Monomers", Chen et al., 1980, pp. 2211-2220.

Primary Examiner—John Kight
Assistant Examiner—Frederick Krass
Attorney, Agent, or Firm—Andrus, Sceales, Starke & Sawall

[57] ABSTRACT

A graft copolymer of lignin and vinylic monomer is produced by a continuous process wherein the vinylic monomer and a suitable initiator compound are continuously, but separately, fed to a solution of the lignin. The monomer is selected from a group consisting of the general formula RCH=CHR'R" where R and R' are H, or alkyl group, and R" is —COOH, —CN or —CONH$_2$ and the initiator is hydrogen peroxide, organic peroxides or persulfates.

17 Claims, 3 Drawing Sheets

PROCESS FOR GRAFTING LIGNIN WITH VINYLIC MONOMERS USING SEPARATE STREAMS OF INITIATOR AND MONOMER

FIELD OF INVENTION

This invention relates to a novel process for grafting lignin with vinylic monomers. More particularly, it pertains to a process and a product thereof for preparation of graft copolymers suitable for dispersion, scale control and flocculation applications.

PRIOR ART

As used herein, the term "lignin" has its normal connotation, and refers to the aromatic polymers recovered from spent pulping liquors such as alkali pulping black liquors produced in the Kraft, soda and other well-known alkali pulping operations, and sulfite liquor from the sulfite pulping processes. The term, "sulfonated lignin" refers to the product which is obtained by the introduction of sulfonic acid groups into the lignin of black liquors. The term "lignosulfonate" refers to the reaction product of lignin which is inherently obtained during the sulfite pulping of wood, straw, bagasse and the like.

Numerous modifications have been made to lignin in order to improve certain properties, such as dispersing ability, flocculating ability, flame retardancy, binding property, and thermoplasticity. Among the modification reactions, grafting of lignin with certain vinylic monomers has often been performed in the prior art to introduce improved performance properties to the lignin. For example, a water-based drilling mud composition is described in U.S. Pat. No. 4,374,738 which comprises an aqueous dispersion of a clay material and a graft copolymer of lignosulfonate and an acrylic compound selected from the group of acrylic acid, acrylonitrile, and acrylamide. In U.S. Pat. No. 4,276,077, a method is revealed for improving a soil structure by stabilization of aggregates with graft copolymers obtained from crude lignosulfonate and monomers selected from the group of vinyl cyanide (acrylonitrile), vinyl acetate, acrylamide or combinations thereof. Soviet Union Pat. No. 1,168,515 teaches the use of a copolymer of lignosulfonate and (meth)acrylic acid in inhibiting the deposit of inorganic salts.

The chemistry of grafting lignin with vinylic monomers has also been studied by numerous scientists in the last two decades. Thus, Koshigima and Muraki published reports on radical grafting of vinyl monomers onto hydrochloric acid lignin by radiation in the Journal of Polymer Science 6: 1431 (1968), and the chemical initiators in Journal of Japan Wood Research Society 13: 355 (1967). Chernyavskaya and Berlin worked on grafting of methyl acrylate onto hydrolyzed wood lignin using peroxide initiator, Khim. Drev. 1: 96 (1978). A study on graft copolymerization of lignosulfonate and acrylic compounds was reported in Journal of Applied Polymer Science, Vol. 25: 2211-2220 (1980). As a general mode of operation, the grafting processes and methods disclosed in the prior art comprise mixing the whole quantity of a vinylic monomer into a lignin solution and subsequently initiating the grafting reaction by addition of certain initiators. The initiators commonly used are hydrogen peroxide, organic peroxides and persulfate. These initiators react with vinylic monomers to produce free radicals which rapidly self-condense to form homopolymers in the absence of lignin. Homopolymerization of monomers is a violent, exothermic reaction and will proceed until all monomer molecules are consumed (a chain reaction). In the presence of lignin, lignin can quench the reaction by capturing the homopolymer radicals and this is termed "a termination reaction". Depending on the relative reactivities of lignin and vinylic monomers, the extent of the homopolymerization and the termination reactions can vary greatly. For the purpose of this invention, the prior art grafting processes are called one-step process wherein the whole quantity of a vinylic monomer is added to a lignin solution prior to the addition of an initiator compound, and the lignin is in contact with the whole quantity of the monomer used before the grafting reaction is started by the initiator. As a consequence, in the prior art process a large number of the molecules of a vinylic monomer will have a chance to collide to form long-chain homopolymers prior to being captured by the lignin. The graft copolymers of this type tend to have high molecular weights, with accompanying high solution viscosity and poor performance properties as dispersants, flocculants and scale inhibitors.

This invention offers a novel grafting process for lignin wherein the vinylic monomer and the initiator are continuously, but separately, fed into a solution of lignin. In this manner, the lignin is in contact with a small quantity of the monomer at any instant moment, and consequently the monomer molecules tend to have fewer collisions (than in the one-step process), thus forming homopolymers of lower molecular weights prior to being captured by the lignin molecules. The invention process is useful for producing graft copolymers of lignin that are low in solution viscosity and with performance properties superior to the prior art products.

SUMMARY OF THE INVENTION

It has been found that a graft copolymer of lignin and vinylic monomer having low solution viscosity and improved performance properties is produced by a continuous process wherein said vinylic monomer and a suitable initiator compound are continuously, but separately, fed to a solution of the lignin, said monomer being selected from a group consisting of the general formula, RCH=CHR'R", where R and R' are H, or alkyl group, and R" is —COOH, —CN or —CONH$_2$, such as acrylic acid, acrylamide, acrylonitrile, methacrylic acid or methyl methacrylic acid, as well as other vinylic monomers such as maleic acid, vinyl acetate or hydrolyzed vinyl acetate, and said initiator being hydrogen peroxide, organic peroxides or persulfates. Specifically, the process of the invention comprises: (1) forming a solution of lignin having a solids concentration of 20 to 60%, pH 1 to 4 and containing 0.1 to 0.5% of ferrous sulfate by weight of lignin solids; (2) continuously feeding into the lignin solution a vinylic monomer or a mixture of vinylic monomers at a rate of 0.1 to 0.5 moles per minute per kilogram of lignin until from 1 to 30 moles of said monomer per kilogram of lignin have been added; and (3) simultaneously feeding into said lignin solution an initiator at a rate of 0.01 to 0.05 moles per minute per kilogram of lignin until from 0.1 to 3 moles of said initiator per kilogram of lignin have been added.

For best results, continuous mixing after completion of addition of the vinylic monomer(s) and initiator for a period of 30 minutes to 2 hours should be performed.

The process provides compositions of matter that are particularly useful as dispersants and scale inhibitors in water treatment applications.

DETAILED DESCRIPTION OF THE INVENTION

In accordance with this invention graft copolymers of lignin having low solution viscosity and superior dispersant properties are obtained by contacting said lignin simultaneously with small quantities of vinylic monomer(s) and a radical initiator. This is achieved by continuously feeding said monomer(s) and initiator separately to a solution of lignin.

Figure 1:
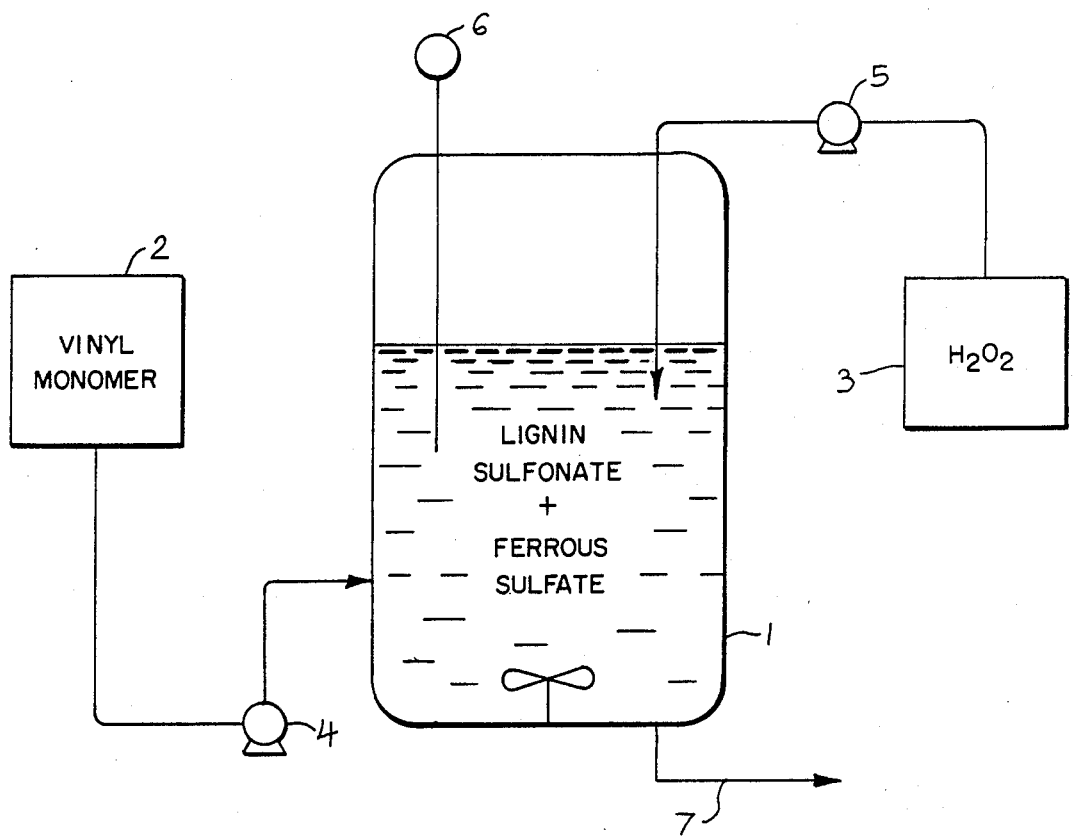
FIG. 1 shows a schematic representation of the invention process for grafting lignin sulfonate with vinylic monomer.

Thus, according to the method of this invention, and referring to the drawing (FIG. 1), a solution of lignin (i.e. a sulfonated lignin) and ferrous sulfate is formed in a reaction vessel (Tank 1) under good stirring. Ferrous sulfate is utilized as a catalyst in the system. Other known catalysts might also be employed if desired. The pH of said solution is adjusted to between 1 and 4, preferably between 2.5 and 3.5 with a mineral acid or caustic. Mixing for at least 30 minutes is done to dissolve all ferrous sulfate. A vinylic monomer (in Tank 2) and hydrogen peroxide (in Tank 3) are simultaneously delivered to the reaction vessel using Pumps 4 and 5, respectively. The flow rates of said monomer and hydrogen peroxide are adjusted to 0.1–0.5 and 0.01–0.05 moles per minute per kilogram of lignin sulfonate, respectively. Flow rates inside these ranges tend to produce copolymers of optimal performance properties. Although hydrogen peroxide is used in this illustration, other radical initiators (e.g., organic peroxides, persulfate, etc.) can also be used. The vinylic monomer and initiator should be continuously fed into the lignin solution until from 1 to 30 moles of the monomer and 0.1 to 3 moles of the initiator, per kilogram of lignin, have been added.

As soon as the monomer and peroxide are delivered into the lignin solution tank, an exothermic reaction is immediately initiated and the solution temperature may eventually rise to above the boiling point without cooling. The degree of temperature rise (measured by Gauge 6) depends on the amount of monomer and peroxide added. For best results, the solution temperature should be kept below 95° C., preferably between 60° and 80° C. by cooling. After the addition of the reactants is completed, stirring may be continued for 30 to 60 minutes and thereafter the product solution is discharged through outlet 7 to a storage tank.

To achieve the best results according to the process of the invention, the two streams of reactants (vinylic monomer and initiator, e.g., $H_2O_2$) are fed into the reaction vessel at two inlet points that are sufficiently apart from each other so the monomer is intimately mixed with the lignin prior to being initiated by the peroxide. In the course of reaction, if the solution temperature rises above 90° C., foaming tends to become severe. The use of a suitable defoamer may be necessary to reduce the foam. Foaming can also be cut down by cooling with ice or cold water.

When non-sulfonated or low-sulfonated lignins are employed in the process, a suitable solvent or solvent mixture should be used for forming a lignin solution of sufficiently low viscosity.

Figure 2:
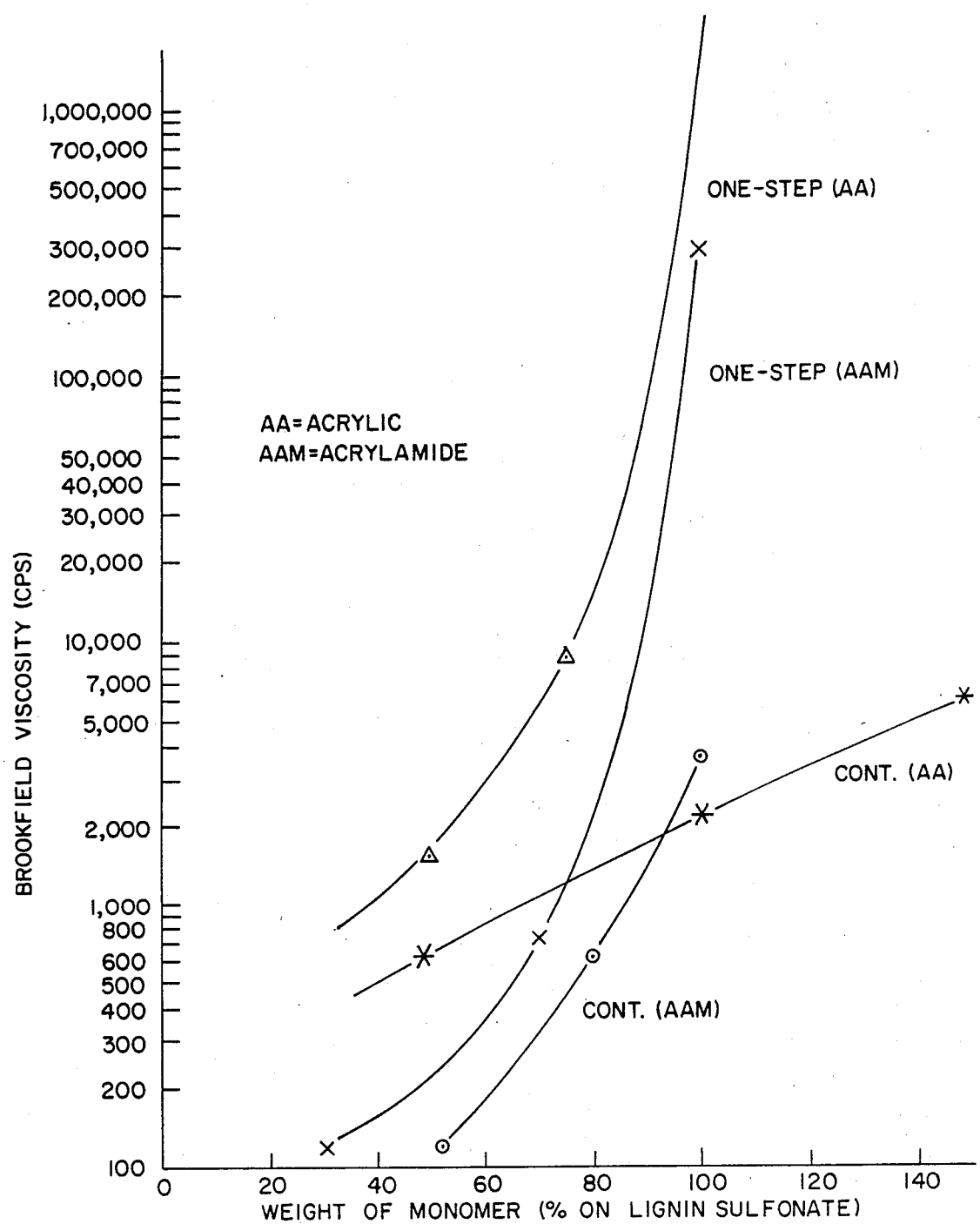
FIG. 2 compares viscosity data of copolymers of the prior art versus the invention processes.

Two definite benefits are obtained by use of the invention process for grafting lignin with vinylic monomers. Firstly, comparing the prior art method of grafting wherein all monomers are reacted at once with the lignin, the invention process produces copolymers of much lower solution viscosity. This difference is illustrated in FIG. 2 wherein the solution viscosity of copolymers made with a crude hardwood lignosulfonate and acrylic acid (52% solids concentration), or acrylamide (40% solids concentration) is plotted against the dosage of the monomers used. The graft copolymers from the prior art one-step process exhibit a much higher solution viscosity than that produced by the invention process. Secondly, the invention process yields copolymers that are unexpectedly superior as water treatment chemicals to the conventional graft copolymers.

The following examples will serve to demonstrate the advantages, and the practice of the invention. These examples are merely intended for illustration without in any way limiting the scope of the invention.

EXAMPLE ONE

A hardwood spent sulfite liquor (Norlig 42) was used, which contained (in percentages) about 65 sodium lignosulfonate and 18 reducing sugars, the remainder being inorganic salts, polysaccharides, and the like. The liquor (35% solids concentration, pH 2.7) containing 120 pounds of solids was placed in a 55-gallon reaction vessel and mixed with 0.3 pound of ferrous sulfate monohydrate until all sulfate was dissolved. Acrylic acid and hydrogen peroxide (35% solution) were pumped simultaneously, but separately, into the liquor at a flow rate of 2.25 and 0.32 pounds per minute, respectively. After a total pumping time of 40 minutes, the pumping was stopped and stirring was continued for additional 60 minutes. The total amounts of acrylic acid and hydrogen peroxide added were 90 and 4.48 pounds, respectively (corresponding to 75% and 3.75%, respectively on weight of spent sulfite liquor solids). The exothermic reaction raised the temperature from 29° C. to 85° C. at the completion of pumping. The pH, viscosity and solids concentration of the final product were 2.1, 210 centipoises at 25° C. and 44%, respectively.

EXAMPLE TWO

A copolymer corresponding to Example ONE but produced according to the prior art one-step process was prepared. Thus, the hardwood spent sulfite liquor as in Example ONE, containing 120 pounds of solids was mixed with 0.3 pound of ferrous sulfate monohydrate and 90 pounds of acrylic acid for 30 minutes until all sulfate was dissolved. The total amount of hydrogen peroxide (12.8 pounds of 35% $H_2O_2$) was thereafter added to the mixture at once. The exothermic reaction initiated by the peroxide generated a substantial amount of heat and cooling was necessary to maintain the temperature below 85° C. The pH, viscosity and solids concentration of the final produce solution were 2.1, 3500 centipoises and 44%, respectively.

EXAMPLE THREE

This example compares the performance of the copolymers made according to the invention process (Example ONE) and the prior art method (Example TWO). In laboratory tests, the copolymers and several commercial synthetic polycarboxylic acids were evaluated for dispersant properties for a variety of materials including iron oxide, calcium carbonate, calcium phosphate, calcium and magnesium silicate. These materials are commonly encountered in industrial waters that require chemical treatments.

1. Magnesium silicate dispersion test. To 500 ml of distilled water is added 0.6 g of $MgCl_2 \cdot 6H_2O$. Add dispersant and adjust pH to 8 with diluted NaOH. Heat to 70° C. and add 0.876 g of $NaSiO_3 \cdot 9H_2O$ to give a total of 600 ppm theoretical $MgSiO_3$ precipitate. The mixture is heated at 70° C. for 30 minutes under magnetic stirring. After cooling for 30 minutes, observe occurrence of flocking. The minimum quantity of dispersant required to prevent flocking is Qm.

2. Calcium silicate dispersion test. To 500 ml of distilled water is added 0.287 g of $CaCl_2$ and dispersant. Adjust pH to 10.5 and add 0.74 g of $Na_2SiO_3 \cdot 9H_2O$ to give a total of 600 ppm theoretical $CaSiO_3$ precipitate. The mixture is heated at 70° C. for 30 minutes under magnetic stirring. After cooling for 30 minutes, observe occurrence of flocking. The minimum quantity of dispersant required to control flocking is Qm.

3. Calcium phosphate dispersion test. To 500 ml of distilled water is added 0.097 g of $CaCl_2$ and dispersant. Add 0.235 g of $NaHPO_2 \cdot 7H_2O$ to give a total of 240 ppm theoretical $CaHPO_4$ precipitate. Adjust pH to 8 and heat at 70° C. for 30 minutes under magnetic stirring. After cooling for 30 minutes, observe occurrence of flocking. Determine the minimum quantity (Qm) of dispersant needed to control flocking.

4. Calcium polyphosphonate dispersion test. To 500 ml of distilled water is added 0.122 g of $CaCl_2$ and dispersant. Add 0.015 g of aminotris (methylene-phosphonic acid) and adjust pH to 8.5. Heat at 70° C. for one hour under magnetic stirring. Observe occurrence of precipitation. The minimum amount of dispersant required to prevent precipitation is Qm.

5. Calcium sulfate scale inhibition test. To 500 ml of distilled water is added 2.94 g of $CaCl_2$ and inhibitor/dispersant. Heat at 70° C. for 30 minutes with 3.73 g of $Na_2SO_4$ at pH 8.5. Determine minimum amount (Qm) of dispersant/inhibitor to prevent precipitation.

Table 1 summarizes the results of Tests 1-5. In all tests, the invention copolymer outperforms the prior art product, and compares favorably with the synthetics.

TABLE 1.
Dispersant efficiencies of carboxylic polymers.

| Dispersant/Inhibitor | Qm (ppm) in Test | | | | |
|---|---|---|---|---|---|
| | 1 | 2 | 3 | 4 | 5 |
| Invention Copolymer (Example ONE) | 80 | 150 | 70 | 22 | 6 |
| Prior Art (Example TWO) | 160 | 340 | 120 | 37 | 11 |
| Polyacrylate, Mw 2000 | 90 | 140 | 40 | 15 | 4 |
| Polymaleate | 80 | 140 | 20 | 33 | 4 |
| Unmodified Lignosulfonate (Norlig 42) | 800 | 650 | 350 | 180 | 120 |

6. Iron oxide dispersion test. Synthetic water (one liter) contains:

| 0.277 g | $CaCl_2$ | (100 ppm Ca) |
| 0.310 g | $MgSO_4 \cdot 7H_2O$ | (30 ppm Mg) |
| 0.082 g | $NaHCO_3$ | (60 ppm bicarbonate) |
| 0.663 g | $Na_2SO_4$ | (570 ppm $SO_4$) |
| 0.210 g | NaCl | (310 ppm Na) |

Mix 0.2 g of iron oxide ($Fe_2O_3$), 200-400 mesh size, into 500 ml of the synthetic water. Add 3 ppm of dispersant and stir at 70° C. with a magnetic stirrer for one hour. After settling in a 500-ml graduated cylinder, the transmittance at 600 nm ($T_{600}$) at the 250-ml mark is determined. Low $T_{600}$ indicates good dispersion.

7. Calcium carbonate dispersion test. To 500 ml of distilled water is added 0.665 g $CaCl_2$ and 10 ppm dispersant. Heat at 70° C. for one hour under magnetic stirring with 0.635 g $Na_2CO_3$, pH 9.5. After settling in a 500-ml graduated cylinder for 2 hours, the transmittance at the 250-ml mark is determined. Low $T_{600}$ indicates good dispersion.

Table 2 presents the results of Tests 6 and 7.

TABLE 2.
Dispersant efficiencies of carboxylic polymers.

| Dispersant | $T_{600}$ in test | |
|---|---|---|
| | 1 | 2 |
| Invention (Example ONE) | 59 | 46 |
| Prior Art (Example TWO) | 66 | 66 |
| Polyacrylate, MW 2000 | 83 | 59 |
| Polymaleate | 70 | 72 |
| Norlig 42 | — | 82 |

Figure 3:
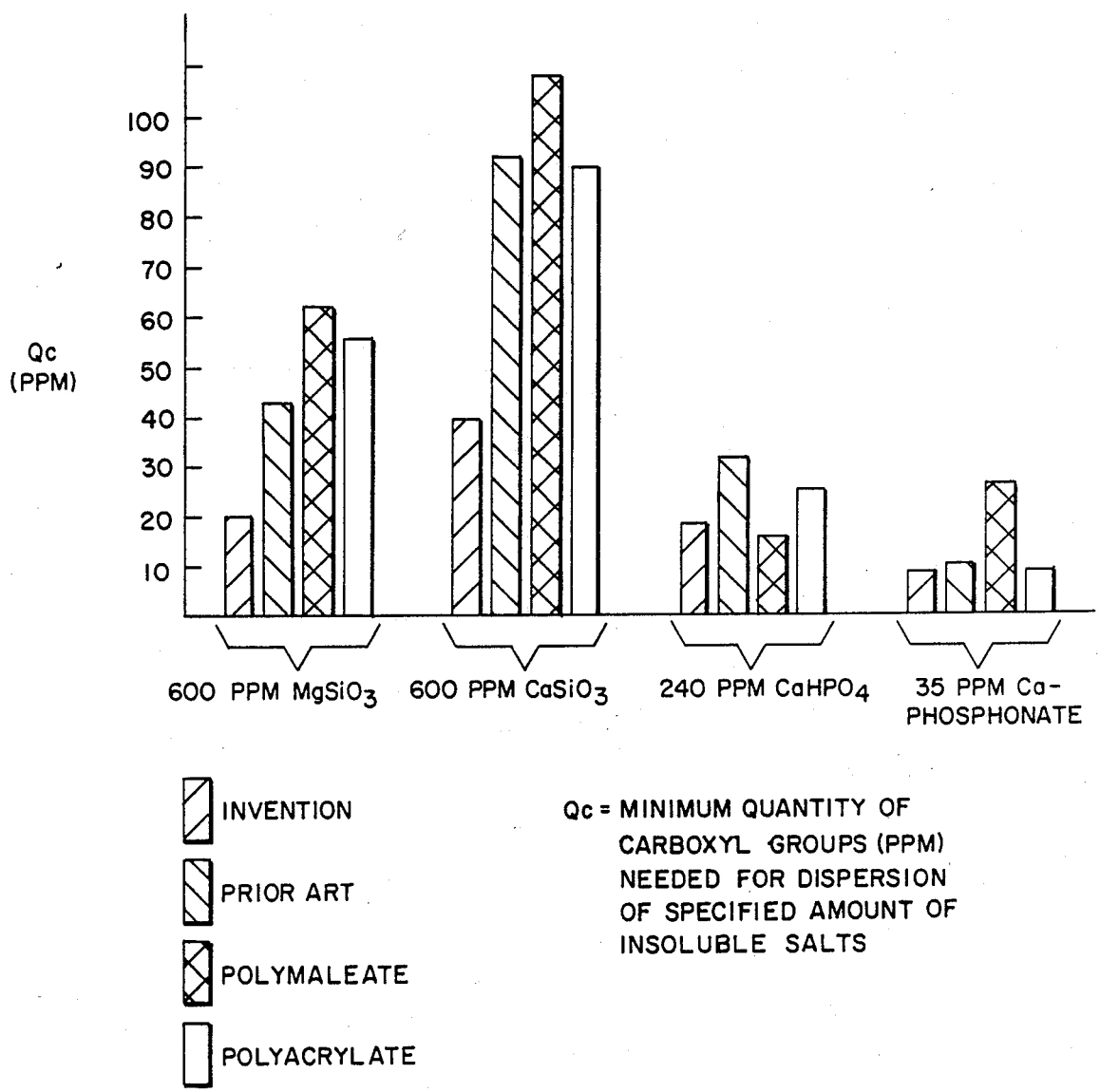
FIG. 3 compares dispersant efficiencies of copolymers of the prior art versus the invention processes, as well as polyacrylate and polymaleate.

The efficiency of a carboxylic polymer can be expressed on the basis of the carboxyl content in the polymer, or Qc, the minimum quantity of carboxyl (—COOH) required for total dispersion of hard water deposits. The relationship between Qc and Qm is $$Qc = Qm \times f$$

where f is the fraction of carboxyl in a carboxylic polymer, e.g., 0.625, 0.775 and 0.267, respectively for polyacrylic acid, polymaleic acid and Example ONE and TWO copolymers. FIG. 3 shows Qc values in four tests for the four polymers evaluated. The high efficiency of the carboxylic groups in the invention copolymer (requiring low Qc to disperse the precipitates) proves the uniqueness of the invention process for grafting lignin with vinylic monomers.

Various modes of carrying out the invention are contemplated as being within the scope of the following claims particularly pointing out and distinctly claiming the subject matter regarded as the invention.

We claim:

1. A process for grafting lignin with vinylic monomers which comprises:
    (a) forming a lignin solution having a solids concentration of 20 to 60%, pH 1-4 and containing 0.1 to 0.5% of ferrous sulfate by weight of lignin solids;
    (b) continuously feeding into said lignin solution a vinylic monomer or a mixture of vinylic monomers at a rate of 0.1 to 0.5 moles per minute per kilogram of lignin until from 1 to 30 moles of monomer(s) per kilogram of lignin have been added; and
    (c) simultaneously, but separately from said monomer or monomer mixture, feeding into said lignin solution an initiator at the rate of 0.01 to 0.05 moles per minute per kilogram of lignin until from 0.1 to 3 moles of said initiator per kilogram of lignin have been added.

2. The process of claim 1 further including the step of continuous mixing after completion of addition of the vinylic monomer(s) and initiator for a period of 30 minutes to 2 hours.

3. The process of claim 1 in which said lignin is a sulfonated lignin.

4. The process of claim 1 in which said lignin is a lignosulfonate.

5. The process of claim 1 in which said monomer(s) and said initiator are fed to said lignin solution at two inlet locations that are sufficiently spaced apart from each other so the monomer(s) is intimately mixed with the lignin prior to being initiated by the initiator.

6. The process of claim 1 in which said vinylic monomers are of the general formula, RCH=CHR'R" where R and R' are H, or an alkyl group, and R" is —COOH, —CN or —CONH$_2$.

7. The process of claim 1 in which said vinylic monomers are selected from the group consisting of acrylic acid, acrylamide, acrylonitrile, methacrylic acid, methyl methacrylic acid, maleic acid, vinyl acetate and hydrolyzed vinyl acetate.

8. The process of claim 1 in which the pH of the lignin solution is 2.5 to 3.5.

9. The process of claim 1 in which said initiator is selected from the group consisting of hydrogen peroxide, organic peroxides and persulfate.

10. A process for grafting lignin with a vinylic monomer wherein said vinylic monomer and a suitable initiator compound are continuously and simultaneously but separately fed to a solution of the lignin.

11. The process of claim 10 in which said lignin is a sulfonated lignin.

12. The process of claim 10 in which said lignin is a lignosulfonate.

13. The process of claim 10 in which said monomer(s) and said initiator are fed to said lignin solution at two inlet locations that are sufficiently spaced apart from each other so the monomer(s) is intimately mixed with the lignin prior to being initiated by the initiator.

14. The process of claim 10 in which said vinylic monomer is of the general formula, RCH=CHR'R" where R and R' are H, or an alkyl group, and R" is —COOH, —CN or —CONH$_2$.

15. The process of claim 10 in which said vinylic monomer is selected from the group consisting of acrylic acid, acrylamide, acrylonitrile, methacrylic acid, methyl methacrylic acid, maleic acid, vinyl acetate and hydrolyzed vinyl acetate.

16. The process of claim 10 in which said initiator is selected from the group consisting of hydrogen peroxide, organic peroxides and persulfate.

17. The process of claim 10 further including the step of continuous mixing after completion of addition of the vinylic monomer and initiator for a period of 30 minutes to 2 hours.

* * * * *